United States Patent [19]

Keith

[11] Patent Number: 5,372,892
[45] Date of Patent: Dec. 13, 1994

[54] DESK TOP MAT

[76] Inventor: George A. Keith, 1191 Foxboro La., Bartlett, Ill. 60103

[21] Appl. No.: 63,899

[22] Filed: May 18, 1993

[51] Int. Cl.⁵ .................................................. B32B 9/00
[52] U.S. Cl. .................................. 428/537.1; 428/106; 428/114; 428/323; 428/326; 428/357; 428/535
[58] Field of Search ................ 428/106, 114, 44, 323, 428/326, 357, 537.1, 535, 113

[56] References Cited

U.S. PATENT DOCUMENTS

| 4,112,162 | 9/1978 | Casselbrant | 428/106 |
| 4,615,936 | 7/1986 | Baum | 428/285 |
| 4,743,484 | 5/1988 | Robbins | 428/106 |

Primary Examiner—Patrick J. Ryan
Assistant Examiner—Abraham Bahta
Attorney, Agent, or Firm—Paul H. Gallagher

[57] ABSTRACT

A desk mat for a desk or other piece of furniture. The mat includes a plurality of layers of wood, which are by nature biodegradable. The top layer is a veneer and is of wood in its natural condition. The other layers include a cork layer and a chip board layer, but the veneer is continuous and integral wood. A glue, which is practically degradable, glues the layers together, and the finished mat is coated with a finish coating. The coating protects the layers and enables the finished mat to be bent or curved without cracking or other debilitation of the mat.

14 Claims, 1 Drawing Sheet

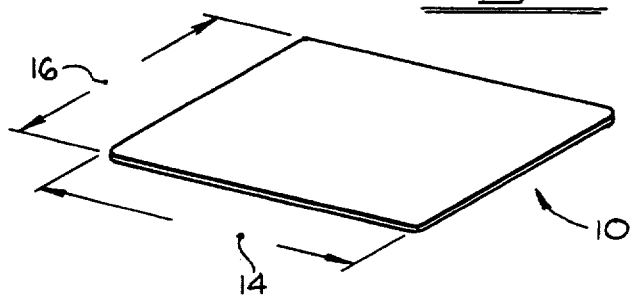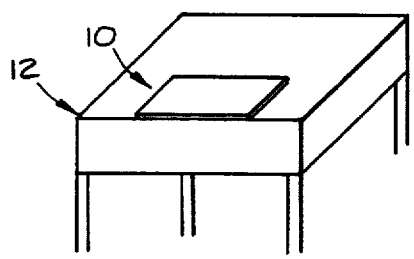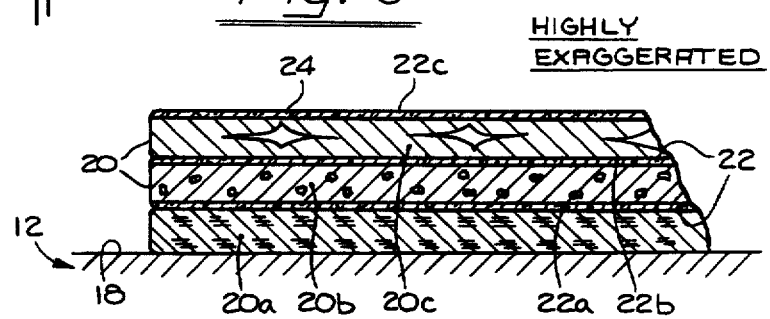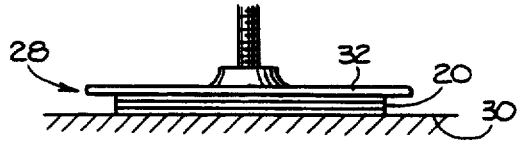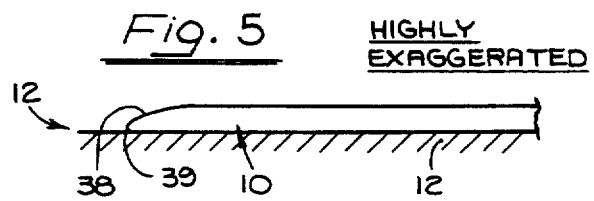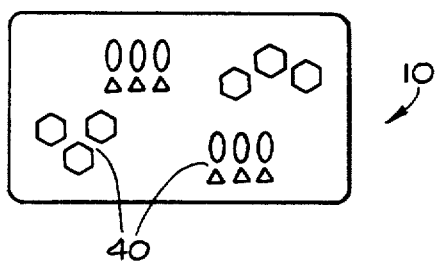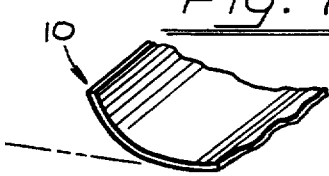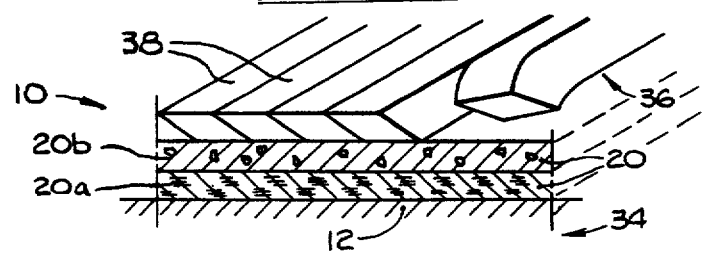

DESK TOP MAT

SUMMARY OF THE INVENTION

The device of the invention is a mat to be placed on a desk, or other piece of furniture. The primary purpose of such a mat is to protect the desk surface, but the mat of the present invention has another advantage and very important purpose, namely to present an attractive enhancing appearance to the article of furniture. The mat may be of a size smaller than the desk top, or it may be customized to be of the same size as the desk, if so desired, to present a complete surface that may appear as the actual desk surface itself.

The mat of the present invention includes as a main feature, that it is made up of a plurality of wood layers including a top layer which constitutes a veneer, and other layers, and glue and finish coating, producing a synergistic effect, for a new combination.

More particularly, the mat possesses novel features and advantages as follows:

1. The materials of the layers making up the mat are constituted by wood products, and thereby are considered biodegradable through decomposition. The layers are adhered together and the mat is provided with a finish coating that is of such nature and quality as to be, from a practical standpoint, biodegradable, and environmentally friendly.

2. The mat includes a veneer, which constitutes the top layer of the mat, made of wood, which can be selected and treated according to a desired effect to have a certain appearance or visual relationship to the wood of the desk on which it is used.

3. The mat is flexible, and can be bent without cracking or injuring of the wood veneer or other layers of the mat, this being enabled by the use of a certain finish coating.

4. The wood veneer, as protected by the finish coating is resistant to attack or damage by other materials such as coffee, soft drinks, alcohol.

5. In one form of the device, the veneer or top layer may be reconstituted or re-cut veneer to produce an unusual appearance.

BRIEF DESCRIPTION OF THE INDIVIDUAL FIGURES OF THE DRAWINGS

FIG. 1 is a perspective view of a desk top mat of the invention.

FIG. 2 is a perspective view of a mat resting on a desk.

FIG. 3 is a cross-sectional view of highly exaggerated dimensions, of a mat made according to the invention.

FIG. 4 is a view indicating high pressure in forming the mat.

FIG. 5 is a semi-diagrammatic view of a mat on a desk.

FIG. 6 is a face view of a mat, showing a design thereon.

FIG. 7 is a fragmentary perspective view of a mat in a bent condition, indicating its flexibility.

FIG. 8 is across-sectional view, semi-diagrammatic in nature, showing a mat including a veneer made up of reconstituted veneer.

DETAILED DESCRIPTION

Referring in detail to the drawings, the description is directed first to the mechanical or physical construction of the mat, to be followed thereafter by details of the materials used in making it up, and the steps involved therein.

The mat of the invention is shown in its entirety at 10, in FIG. 1, and it is shown on a desk 12 in FIG. 2. The mat in its overall size and proportions is in the form of a thin sheet, as indicated in FIG. 1, and it may be of any desired dimensions. For example, it may as in FIG. 2 where it occupies a small portion of the surface of the desk. The mat also is well adapted to customized fabrication, that is, it may be made of the same size and shape of the desk top itself, so as to completely cover the desk, and may be of such make up in visual characteristics as to appear as a constructional part of the desk itself, and its surface to appear as the surface of the desk.

The mat may be of any desired size, a very common size being 36" wide in the direction 14 and 24" deep in the direction 16. It may be of other sizes instead, and there is no limit from a practical standpoint as to the size and proportions of the mat. These dimensions are of separate consideration from the customized mat referred to above, in which it is the same size as the desk.

The mat will have a thickness, depending on the character of the veneer or thickness of the layers making up the mat.

FIG. 3 indicates a desk 12 having a top surface 18 on which the mat 10 rests. The mat, as shown in this figure, is made up of three layers 20, being individually identified 20a, 20b, 20c. The bottom layer, 20a is made up of cork which provides a non-abrasive, but high gripping effect, normally holding the mat in position, but the mat can be manually moved, even against the high friction effect, and in doing so, it does not scratch or otherwise impair the surface of the desk. The cork layer 20a in itself is of known kind, being made of cork particles adhered together in a known manner and in sheet form.

The middle layer 20b is made of chip board, which also is a known material and in sheet form, and it need not be described in detail.

The top layer 20c is of wood. This top layer is referred to as a layer in the generic identification of the three layers, but is referred to here, particularly in the claims, as a veneer. It is made of wood, any of various kinds referred to below, and is of sheet form and has a top surface which is exposed in the completed mat.

The layers 20 may be of any desired thickness, within practical limits, and as an example of a practical mat, and one that serves its purpose well, the bottom layer of cork may be 1/32" in thickness, the middle layer of chip board 0.02" in thickness, and the top veneer of 0.010 mm in thickness. Obviously these dimensions or thicknesses are examples only, and the invention is not to be limited to those specific dimensions.

The layers are adhered together by a glue which as one example used is a product called 3M—FAST BOND, also known as a green contact adhesive. This glue is a low volatile organic material, containing no CFC's—ozone depleting chemicals. It could be reusable, and may be recyclable, and is generally considered degradable. The glue is applied to the three layers as mentioned, and then the stack of layers 20 is put in a press 28 as shown in FIG. 4, the press having a base 30 and a top plate 32. Suitable pressure is applied to this stack, such as 3000 lbs./sq. in., this pressure being applied for in the neighborhood of 1-2 minutes. In this case also the value of the pressure and the time in which it is applied, are examples, and the invention is not limited specifically to those values.

The layers of glue are identified 22, individually as 22a, 22b, in FIG. 3. The veneer, or top layer, 20c is coated with finish coating indicated at 22c. This finish coating is of water base. It is identified as Star Chemicals water base sealer and lacquer. This finish coating is environmentally friendly, and from a practical standpoint may be considered biodegradable. Considering the overall materials of the mat, the layers 20 are of wood product, and as indicated above are therefore biodegradable; the glue 22a, 22b, and the finish coating 22c as indicated above, are completely environmentally friendly, and also from a practical standpoint may be considered degradable.

The finish coating 22c has an added advantage in that when applied to the veneer 20c, it enables the mat, including the veneer and the other two layers, to be flexed, or bent, as indicated in FIG. 7. This may be done without fracture or other impairment to any of the materials of any of the layers, whereas in the absence of such finish coating, such flexing cannot be accomplished.

The finish coating is applied of course to the surface of the veneer, and in addition to enabling the flexing thereof, it protects the veneer whereby the veneer becomes resistant to outside materials, including for example, coffee, soft drinks, alcohol, etc.

The wood constituting the veneer, 20c, when in such sheet form, presents a wood appearance. The finish coating may be of sufficient transparency as to enable the finish of the wood to show therethrough, and it may be clear or nearly clear, so as not to change the color of the surface of the veneer, but it is also possible, instead and if desired, to utilize a coating having color, to cover a corresponding portion of the spectrum, to blend with the piece of furniture.

The mat is well adapted to desks of wood, in which the top surface of course has an obvious wood appearance. The mat of the present invention enables the veneer 20c to be selected according to appearance, to provide a visual relationship with the surface of the desk. These surfaces just referred to may be the natural appearance of those materials, and so referred to.

The mat of the invention is also well adapted to the situation that desks may be made of various kinds of woods, of a wide variety, and the wood making up the veneer 20c may be selected according to the wood of the subject desk. Woods adapted to the present invention, and in which they constitute the veneer, include oak, walnut, mahogany, cherry, maple, and teak. Accordingly, such woods may appear very similar to corresponding woods in the desk. The invention is not limited to any specific such woods.

The utilization of such woods, corresponding to the woods of the subject desks, has best effect in the case of mats that are of smaller size, such as referred to above, e.g. 36"×24" where the surface of the desk is of extensive area around the mat. In this case the appearance of the top surface of the mat is produced or developed according to the surface of the desk top. The relationship between the mat and the desk top may be of a wide range of effects, at one end of the range, the appearance may be very similar, and so similar as to produce an effect of identity; at the other end of the range, the appearance of the mat may be in high contrast to the appearance of the desk top; innumerable effects can be produced within the limits of that range.

To facilitate and enhance the relationship between the appearance of the mat and of the desk, the mat at its edges may be curved or reduced in thickness as indicated at 38 in FIG. 5. This reduced dimension, or incline, may be very gradual for the most part, and have a relatively fine edge 39, the latter however being not so fine as to be sharp. This incline or taper increases the effect of the blending of the surfaces of the mat and desk. Even in the case of a customized mat, in which the mat is of the same size and shape as the desk, the tapered edge 38 may be used also, to present a finished appearance blending into the edge of the desk.

The mat of the invention also may be made as indicated in FIG. 8. In this figure, the mat, indicated at 10, includes the lower two layers, 20a, 20b, but the veneer, or top layer, here indicated as 36, is made up of reconstituted or re-cut veneer. This veneer includes a plurality of strips 38 cut from wood, and adhered together in side-by-side relation, to form a sheet, this sheet serving as the veneer for the mat. A finish coating 22c, similar to that of the mat of FIG. 3, is then applied to the veneer 36. The mat made according to FIG. 8 possesses all of the features and attributes of the first form of mat.

Most often the subject desk has an exposed top surface of wood, which of course shows a wood pattern. The veneer being made of wood, also presents a wood pattern. As used herein for generic reference, and particularly in the claims, these patterns may also be referred to as designs, and even as visual appearances. While these patterns are natural, it is also within the scope of the invention, to provide an artificial artistic design, as shown at 40 in FIG. 6. When a design such as 40 is utilized, it may be applied by silk screening, or by other known methods. It may be applied directly to the veneer surface itself, or over the finish coating.

Within the scope of the invention, the mat may be made according to the foregoing, in which the mat is constituted entirely by the layers 20, and does not have a separate border, that is, the edges of the layers together constitute the corresponding edges of the entire mat. However, if it should be desired, the mat as disclosed hereinabove may be utilized together with a border member, or other features or accoutrements.

I claim:

1. A desk top mat comprising,
a plurality of layers of all wood in a stack,
the layers including,
a bottom layer of cork of non-abrasive and high gripping character forming a corresponding bottom surface of the mat,
a middle layer of chip board,
a top layer of veneer.

2. A desk top mat according to claim 1 wherein,
the layers are bound together by biodegradable glue, and
the top layer has a finish coating of biodegradable material.

3. A desk top mat according to claim 1 wherein,
the mat is made up entirely of the three layers stated.

4. A desk top mat according to claim 1 wherein,
the veneer has a natural appearance of wood, and the finish coating is sufficiently transparent that said natural appearance shows therethrough.

5. A desk top mat according to claim 1 wherein,
a decorative pattern or design is imprinted on the veneer, and
the finish coating can be applied before or after the pattern or design.

6. A desk top mat according to claim 1 wherein,
the veneer is of any of the following woods, oak,
walnut,
mahogany,
cherry,
maple,
teak.

7. A desk top mat according to claim 1 wherein, the mat is flexible, and capable of being flexed without cracking or impairing the veneer.

8. A desk top mat according to claim 1 wherein, the veneer is made up of reconstituted or re-cut veneer.

9. A desk top mat according to claim 2 wherein, the mat is constituted solely by the layers, wherein the edges of the layers form the boundary of the mat.

10. A desk top mat according to claim 9 wherein, the mat has a bevelled border decreasing to a relatively thin edge thereby enhancing the appearance of the surface of the mat blending into the surface of the desk top.

11. A method of forming a mat for a desk having a top surface of predetermined size and shape comprising the steps,
forming a mat of layers including a top veneer,
the mat having a size and shape as determined by the layers without border elements other than the layers, and the size and shape thereof being coincident with the size and shape of the desk top surface,
whereby the mat, when positioned on the desk top surface, appears as an integral constructional part of the desk.

12. A method of forming a mat for a desk having a top surface of predetermined size and shape with predetermined visual appearance, comprising the steps
forming a mat including a top veneer,
the mat having a size and shape as determined by the layers without elements other than the layers, and the size and shape thereof being less than the size and shape of the desk top surface,
providing such a top veneer having predetermined visual relationship to the desk top surface.

13. A method according to claim 12 and including the step,
providing a visual effect on the veneer similar to that on the desk top surface and so similar as to be virtually identical.

14. A method according to claim 12 and including the step of,
providing said visual effect on the top surface of the veneer in contrast to that on the desktop surface.

* * * * *